United States Patent
Ryu et al.

(10) Patent No.: US 8,520,937 B2
(45) Date of Patent: Aug. 27, 2013

(54) METHOD OF AUTOMATICALLY CREATING NATURAL IMAGE BY USING OPTIMIZATION TECHNIQUE

(75) Inventors: Jae Chun Ryu, Seoul (KR); Hyoung Kee Kim, Seoul (KR); Yoon Young Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 65 days.

(21) Appl. No.: 13/348,135

(22) Filed: Jan. 11, 2012

(65) Prior Publication Data
US 2012/0183209 A1    Jul. 19, 2012

(30) Foreign Application Priority Data
Jan. 14, 2011    (KR) .............................. 2011-0004095

(51) Int. Cl.
*G06K 9/00*    (2006.01)
(52) U.S. Cl.
USPC ............ 382/162; 382/165; 382/167; 382/274
(58) Field of Classification Search
USPC ......... 382/162, 165, 167, 274, 232; 345/589, 345/605, 506, 553, 475, 441; 704/229, 222, 704/215, 240; 348/453
See application file for complete search history.

(56) References Cited

U.S. PATENT DOCUMENTS

| | | | | |
|---|---|---|---|---|
| 5,630,162 A | * | 5/1997 | Wilkinson et al. | 712/20 |
| 5,809,292 A | * | 9/1998 | Wilkinson et al. | 712/222 |
| 5,815,723 A | * | 9/1998 | Wilkinson et al. | 712/20 |
| 2009/0276193 A1 | * | 11/2009 | Momose et al. | 703/1 |

FOREIGN PATENT DOCUMENTS

| | | |
|---|---|---|
| KR | 100151918 B1 | 6/1998 |
| KR | 1020100094602 A | 8/2010 |

* cited by examiner

*Primary Examiner* — Ali Bayat
(74) *Attorney, Agent, or Firm* — Kile Park Reed & Houtteman PLLC (57) ABSTRACT

A method of automatically creating a natural image which may reduce the torment of creation which is a burden to a designer when creating a new image. To this end, the method includes an initial setting operation of setting an initial condition; a pre-process operation of setting a variable for a phase optimization process; a phase optimization operation of dividing an image to be created into finite elements, assigning values of material properties to the finite elements, performing filtering on the assigned values of the material properties, optimizing a design variable by using an optimization technique, updating a design variable obtained through the optimization process into a new design variable, determining whether the new design variable satisfies a preset convergence criterion, and if it is determined that the new design variable satisfies the preset convergence criterion, outputting a resultant structure; and a post-process operation of converting a final value of a design variable obtained through the phase optimization process into an RGB value of a digital image.

6 Claims, 7 Drawing Sheets

METHOD OF AUTOMATICALLY CREATING NATURAL IMAGE BY USING OPTIMIZATION TECHNIQUE

CROSS-REFERENCE TO RELATED PATENT APPLICATION

This application claims the benefit of Korean Patent Application No. 10-2011-0004095, filed on Jan. 14, 2011, in the Korean Intellectual Property Office, the disclosure of which is incorporated herein in its entirety by reference.

BACKGROUND OF THE INVENTION

1. Field of the Invention

The present invention relates to a method of automatically creating an image, and more particularly, to a method of automatically creating a natural image by using an optimization technique.

2. Description of the Related Art

A work of creating a visual design image is a series of creation steps of formulating a concept to be expressed, determining a method of appropriately expressing the concept, and expressing the concept. For a designer, such a series of creation steps are difficult jobs accompanying mental and physical burden. Also, if the expressed concept does not match the original concept well, a series of steps need to be repeatedly performed again. Accordingly, a work of creating a design image is time consuming and labor consuming. In this regard, if a method of automatically creating an image which may reduce a designer' mental and physical burden is developed, the method may be very useful.

SUMMARY OF THE INVENTION

The present invention provides a method of automatically creating a natural image that looks like it is drawn by hand and may reduce a designer's mental and physical burden.

According to an aspect of the present invention, there is provided a method of automatically creating a natural image by using an optimization technique, the method including: an initial setting step of setting at least one initial condition selected from the group consisting of a size of an image to be created, which is desired by a designer, a configuration of the image to be created, and a color of the image to be created; a pre-process step of defining a physical law to be used for image creation, assigning a value of a design variable, a value of a material property, and a boundary condition according to the physical law, and setting at least one variable for an optimization process selected from the group consisting of a target function, a maximum volume fraction, a maximum iteration number, and a convergence criterion; an optimization step of optimizing the design variable by using one optimization technique selected from the group consisting of an optimality criterion (OC), a method of moving asymptotes (MMA), and genetic algorithms according to the variable determined in the pre-process step; and a post-process step of converting a resultant value of the design variable obtained through a phase optimization process into a digital image.

The optimization step may include dividing the image to be created into finite elements and assigning values of material properties to the finite elements, wherein the assigning of the values of the material properties to the finite elements includes performing interpolation by using a background image such that values of colors given to pixels of the background image correspond to the values of the material properties.

The optimization step may include: a finite element analysis step of analyzing a physical system by solving a governing equation that determines a physical law selected under a given boundary condition according to the selected design variable; a sensitivity analysis step of calculating a value of a target function of the optimization process by using a solution of the physical system obtained in the finite element analysis step, and quantitatively determining how a total value of the target function is affected by a value of a design variable assigned to each of the finite elements in order to determine how to change the design variable; a filtering step of mathematically adjusting a sensitivity of each element obtained in the sensitivity analysis step to achieve visual harmony with neighboring finite elements in consideration of a value of the sensitivity of each element and an influence of a sensitivity of each neighboring element; an optimization step of determining values of design variables of elements are appropriate in a current step by using a target function, a sensitivity, and a filtered sensitivity obtained through the finite element analysis step, the sensitivity analysis step, and the filtering step; a design variable updating step of updating the values of the design variables of the current step obtained in the optimization step into a new design variable according to a selected optimization algorithm; and a convergence determining step of determining whether a value of a target function before updating satisfies a preset convergence criterion, if the value of the target function does not satisfy the preset convergence criterion, repeatedly performing from the initial finite element analysis step to the phase optimization process by using the design variable newly set in the design variable updating step, and if the value of the target function satisfies the preset convergence criterion, proceeding to a resultant structure outputting step.

The method may further include: a step of creating an image (a) created by the post-process step and creating a new image (b) by rotating or symmetrically moving the image (a); and a step of creating a new image by overlapping the image (a) and the image (b).

The method may further include: a step of creating a plurality of images by performing the initial setting step, the pre-process step, the optimization step, and the post-process step two or more times; and a step of creating a new image by overlapping the created plurality of images.

The method may further include a step of creating an image pattern by sequentially arranging a plurality of the same images to be adjacent to one another or arranging the plurality of the same images such that the images are symmetric, inverted, or rotated about a boundary line.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention relates to a method of automatically creating a natural image by using an optimization technique.

The term 'natural image' used herein refers to an image that has shading and has a small change in color between neighboring pixels as if the image is drawn by a brush.

The term 'optimization technique' is an engineering technique developed to obtain a design image that is automatically optimized based on a physical and mathematical method, not based on an intuitive design through human experience.

An objective of such an engineering technique is to avoid inaccuracy of the intuitive design, minimize time- and cost-consuming trial and error of the intuitive design, and provide a more creative and innovative design image beyond the limit of human intuitive design.

Such an optimization technique is realized in association with three base technologies in terms of physical, mathematical, and engineering aspects.

First, an analysis technology on a physical system may be represented by a governing equation that mathematically models a specific physical system and a process that solves the governing equation. That is, an appropriate analysis technology on a partial differential equation that models each physical system and is called a governing equation and on an environment such as a boundary condition or an initial condition is required. For example, a heat transfer equation, a wave equation, a Helmholtz equation, a Navier-Stokes equation, and a Maxwell equation are representative governing equations that model physical systems.

Second, once an analysis on a governing equation that models a physical system and on an appropriate environment is performed, a mathematical optimization technology appropriately determines a design variable, a target function, and a restriction condition which meet an objective of a desired design based on the analysis, and obtains a result having better performance by using an optimization method suitable for a given problem. Examples of an engineering optimization algorithm include genetic algorithms, particle swarm, optimality criterion, and method of moving asymptotes.

Third, a technology of visually and structurally defining an engineering design visualizes a result of a design and allows technically easier access to pure mathematical equations. For example, examples of the technology may include a finite element method (FEM) and a solid isotropic material with penalization (SIMP) method that exhibits excellent performance in designing a shape of a structure based on the FEM.

The present invention will now be described more fully with reference to the accompanying drawings, in which exemplary embodiments of the invention are shown.

Embodiment 1

Figure 1:
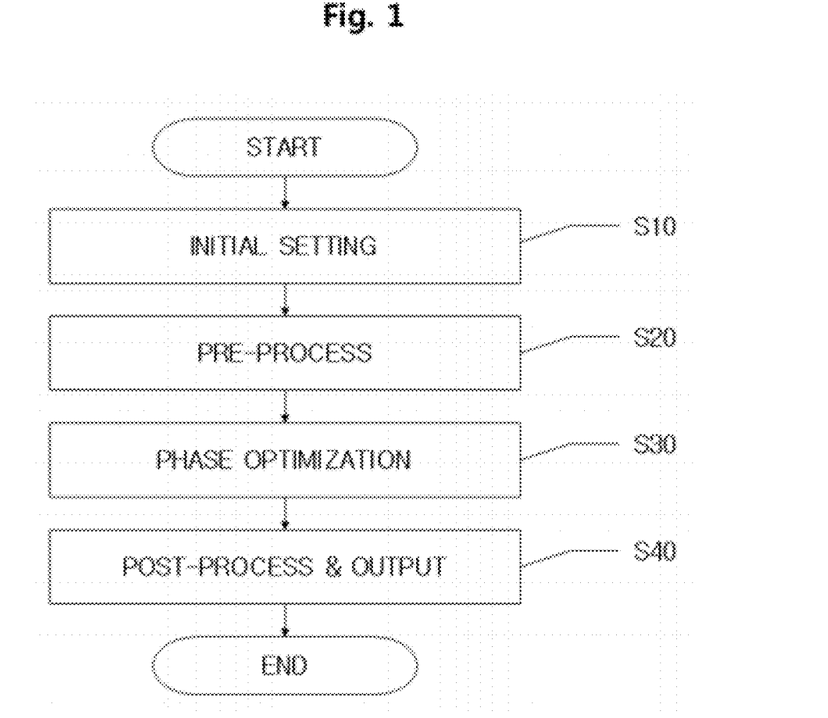
FIG. 1 is a flowchart illustrating a method of automatically creating an image, according to an embodiment of the present invention.

FIG. 1 is a flowchart illustrating a method of automatically creating an image, according to an embodiment 1 of the present invention.

Referring to FIG. 1, the method includes an initial setting step, a pre-process step, a phase optimization step, and a post-process step.

The initial setting step for determining characteristics of an image to be created may set variables such as a size of the image to be created, a configuration of the image to be created, a colour of the image to be created, and other characteristics of the image to be created.

The pre-process step selects a physical law used for image creation in order to convert a work of creating an image into a problem of a physical system such as heat transfer, flow of fluids, and electromagnetism. Also, the pre-process step assigns a value of a design variable, a value of a material property suitable for a selected physical system, and a boundary condition according to the selected physical law, and sets at least one variable for an optimization process selected from the group consisting of a target function, a maximum volume fraction, a maximum iteration number, and a convergence criterion.

For example, if a heat transfer equation is used, a thermal conductivity may be selected as a value of a material property, if a magnetic circuit equation is used, a transmittance may be used as a value of a material property, and if a wave equation is used, a density may be used as a value of a material property. Obviously, these are exemplary and the present embodiment is not limited to the afore-described equations or values of material property.

The step of setting variables for a subsequent phase optimization process may set all values of variables related to the phase optimization process such as a maximum volume fraction, a maximum iteration number, a convergence criterion, a penalty value of an SIMP method, a value of a material property, a boundary condition, and others.

Figure 2:
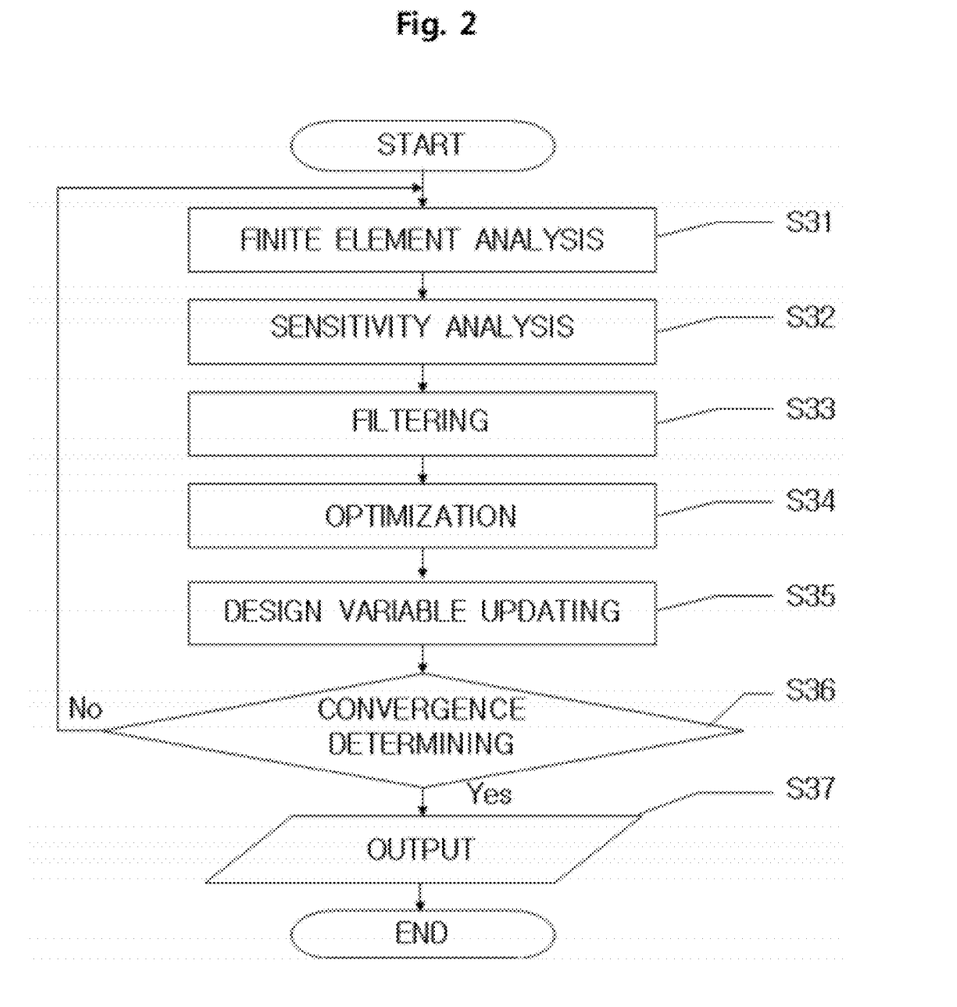
FIG. 2 is a flowchart illustrating a phase optimization step of the method of FIG. 1.

The post-process step, for converting a resultant value of a design variable obtained through the phase optimization process into an RGB value of a digital image, performs the following conversion like Equation 1 on all finite elements.

$$\begin{bmatrix} R_e \\ G_e \\ B_e \end{bmatrix} = \rho_e \begin{bmatrix} R_0 \\ G_0 \\ B_0 \end{bmatrix} \qquad \text{[Equation 1]}$$

where $R_0$, $G_0$, and $B_0$ denote colors to be used selected by a designer in the initial setting step of FIG. 1, $\rho_e$ denotes a value of a design variable of one eth finite element obtained through the phase optimization process, and $R_e$, $G_e$, $B_e$ denote red, green, and blue colors of a digital image assigned to each finite element obtained when the initially selected colors are shown on an image as a result of the phase optimization process. The phase optimization step is described in further detail with respect to FIG. 2.

Referring to FIG. 2, the phase optimization step includes a finite element analysis step, a sensitivity analysis step, a filtering step, an optimization step, a design variable updating step, a convergence determining step, and a resultant structure outputting step.

The finite element analysis step solves a governing equation that determines a physical law selected under a given boundary condition according to a selected design variable and analyzes a physical system. In the finite element analysis step, a design domain is divided into a finite number of elements. The design domain divided into set finite elements corresponds to a canvas of an image to be created.

The sensitivity analysis step calculates a value of a target function of an optimization process by using a solution of the physical system obtained in the finite element analysis step, and quantitatively determines how a total value of a target function is affected by a value of a design variable assigned to each of the finite elements in order to determine how to change the design variable. The filtering step for mathematically adjusting a sensitivity of each element obtained in the sensitivity analysis step considers a value of a sensitivity of each element and an influence of a sensitivity of a neighboring element. The filtering step may soften and diversify a final image, and may use values of various variables assigned to each element other than a sensitivity.

The optimization step uses an optimization technique such as an optimality criterion (OC), a method of moving asymptotes (MMA), or genetic algorithms. The optimization step determines whether values of design variables of elements in a current step are appropriate by using a target function, a sensitivity, and a filtered sensitivity (or other variables) obtained in the finite element analysis step, the sensitivity analysis step, and the filtering step, (or other variables).

The design variable updating step appropriately updating the values of the design variables in the current step obtained in the optimization step into a new design variable according to a selected optimization algorithm.

The convergence determining step for determining whether a value of a target function using a design variable before updating satisfies a preset convergence criterion repeatedly performs from the initial finite element analysis step to the phase optimization process by using the design variable newly set in the design variable updating step if it is determined that the value of the target function does not satisfy the preset convergence criterion, and proceeds to the resultant structure outputting step if it is determined that the value of the target function satisfies the preset convergence criterion. The convergence criterion may be selected according to needs, for example, by using an iteration number or the like.

The phase optimization step of FIG. 2 will be described in further detail with reference to FIGS. 3 through 5.

Figure 3:
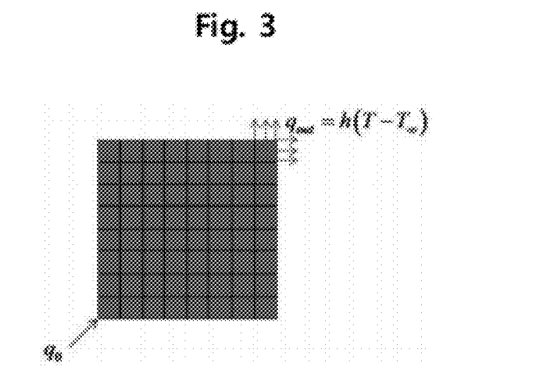
FIGS. 3 through 5 are diagrams for explaining the phase optimization step.
Figure 4:
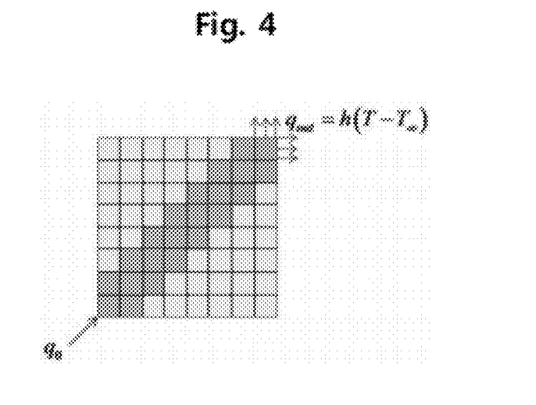
Figure 5:
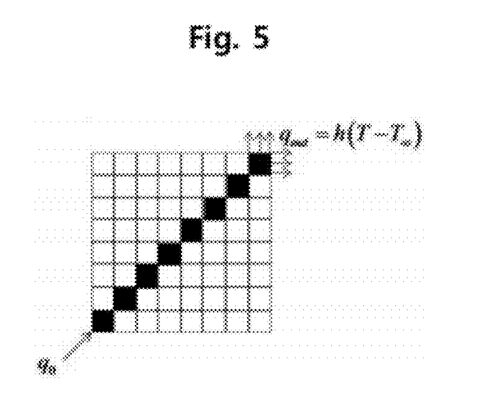

In FIGS. 3 through 5, a heat transfer equation is a governing equation. Although the heat transfer equation is exemplarily used in FIGS. 3 through 5, the present embodiment is not limited thereto, and any equation may be used if the equation models various phenomena in the natural world.

When a heat transfer equation is applied to an optimization technique, a governing equation is defined by Equation 2.

$$\nabla(-k\nabla T)=0 \text{ in } \Omega$$

$$-k\nabla T=q_0 \text{ on } \partial\Omega_N$$

$$T=T_0 \text{ on } \partial\Omega_D \qquad \text{[Equation 2]}$$

An optimization problem of the governing equation may be defined by Equation 3.

$$\text{Minimize } \prod = \sum_{e=1}^{NE} K_e^{-1} T_e K_e \qquad \text{[Equation 3]}$$

$$\text{Subject to } g = \left(\sum_{e=1}^{NE} m_e \rho_e - m_0\right) \bigg/ \sum_{e=1}^{NE} m_e \leq 0$$

$$\rho_{min} \leq \rho_e \leq 1$$

An SIMP method performs interpolation by using a value of a material property $k_e$ of each element based on an FEM as a design variable $\rho_e$ as shown in Equation 4.

$$k_e = k \times \rho_e^p \qquad \text{[Equation 4]}$$

A value of a design variable changes from a value very close to 0 to 1. The SIMP method determines whether there is a material conceptually according to the value of the design variable and finds out an optimal material distribution through an optimization process. For example, if a value of a design variable of an eth element is a minimum value, it is determined that the eth element has no corresponding material, and if a value of a design variable of an eth element is 1, it is determined that the eth element has a corresponding material, so as to find out an optimal material distribution. The SIMP method is used to determine whether R, G, and B color information is present in each pixel in the method of automatically creating the image of the present invention.

In such a phase optimization process, a design domain is defined and is divided into finite elements, and an optimal value of a design variable assigned to each finite element is obtained through an optimization process by using a pure physical governing equation. A value of a design variable obtained through this process ranges from a value very close to 0 to 1. The fact that each finite element of an entire design domain has numeric data between a value close to 0 and 1 is similar to the fact that a digital image is divided into pixels and each of the pixels has RGB information between 0 and 255. On the basis of the fact that characteristics of such a phase optimization technique and characteristics of a digital image may be directly matched to each other, the present invention suggests a method of creating an image by adding characteristics that only an optimization technique may have, unlike a conventional digital image tool.

FIGS. 3 through 5 illustrate a process of finding an optimal heat transfer path through a phase optimization process when a regular square is divided into 64 cells, one heat source $q_0$ is located at a left bottom of the regular square, one heat sink $q_{out}$ is located at a right top of the regular square, and the same material property is assigned to the 64 cells.

That is, FIG. 3 illustrates the initial setting step. FIG. 4 illustrates a change in the phase optimization step of FIG. 2. FIG. 5 illustrates a case where the phase optimization step is sufficiently repeatedly performed and an optimal heat transfer path in units of cells is found, which is pursued in terms of a general engineering aspect.

The present invention relates to not only obtaining of a final heat transfer path, as shown in FIG. 5, but also using of an intermediate result while calculation is performed, as shown in FIG. 4. When a material is sufficiently divided into cells, an image of FIG. 4 shows a soft change, and an image of FIG. 5 is clear and accurate. Accordingly, a natural image like a watercolor painting may be obtained as shown in FIG. 4 and a clear image may be obtained as shown in FIG. 5 according to needs of a designer. In particular, a natural image that looks like it is drawn by a brush, as shown in FIG. 4, may be obtained by using a governing equation that models the phenomena of the natural world. Also, various images may be automatically infinitely created by adjusting the number of cells, a repetition number, a size and color of an image, and so on in the initial setting step.

Embodiment 2

A method of creating various natural images by using the image obtained in the embodiment 1 will be explained as an embodiment 2.

The method of creating the image according to the embodiment 2 further includes an overlapping step that creates a new image through an overlapping process by using the image obtained in the embodiment 1.

Overlapping of images in the overlapping step may be performed as shown in Equation 5.

$$\begin{bmatrix} R_e \\ G_e \\ B_e \end{bmatrix} = \begin{bmatrix} \min\left(1, \sum_{i=1}^{NL} R_e^i\right) \\ \min\left(1, \sum_{i=1}^{NL} G_e^i\right) \\ \min\left(1, \sum_{i=1}^{NL} B_e^i\right) \end{bmatrix};$$

$$\begin{bmatrix} R_e \\ G_e \\ B_e \end{bmatrix} = \begin{bmatrix} 1 - \min\left(1, \sum_{i=1}^{NL} R_e^i\right) \\ 1 - \min\left(1, \sum_{i=1}^{NL} G_e^i\right) \\ 1 - \min\left(1, \sum_{i=1}^{NL} B_e^i\right) \end{bmatrix}$$

[Equation 5]

where $R_e$, $G_e$, and $B_e$ denote red, green, and blue values overlapped and finally assigned to each eth element when not a single color but various colors are used, NL denotes the total number of colors (the number of overlapped layers), min(a,b) indicates that a smaller value from among a and b should be taken. A first one of Equation 5 denotes an additive color mixture and a second one of Equation 5 denotes a subtractive color mixture. Subtraction or addition may be selectively used according to the purpose for use of a created image. Basically, while an RGB value is expressed as an integer having a value of [0.255], the RGB value is mapped to a positive actual value between [0.1] in this process. However, a specific method varies according to a coding process, and calculation may be performed in various ways.

Figure 6:
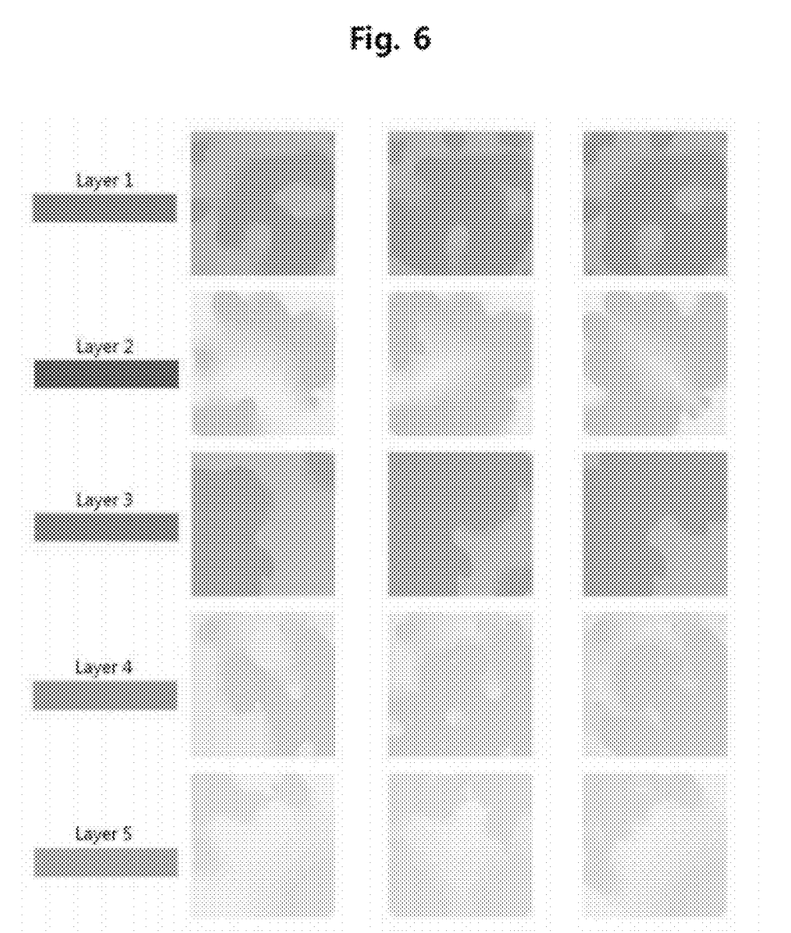
FIG. 6 illustrates images created according to first and embodiment 2s of the present invention.

FIG. 6 illustrates a plurality of natural images having different colors obtained according to the embodiment 1 of the present invention.

In FIG. 6, used colors are displayed in a first column, natural images obtained by using the colors are shown in a second column, images obtained by overlapping the images in the second column with images obtained by rotating the images in the second column by 90 degrees clockwise are shown in a third column, and images obtained by overlapping the images in the second column with images obtained by symmetrically moving the images in the second column about a vertical central line are shown in a fourth column.

More natural images may be created by using various overlapping methods by using natural images obtained according to the present invention.

Figure 7:
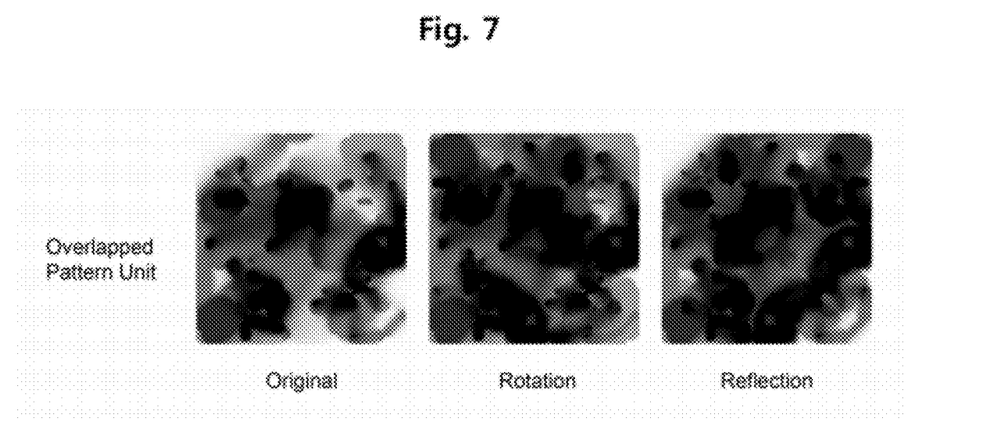
FIG. 7 illustrates images created according to the embodiment 2 of the present invention.

FIG. 7 illustrates images having various colors obtained by overlapping the images shown in FIG. 6. That is, images obtained by overlapping the 5 images in the second column of FIG. 6 by using a subtractive mixture are shown in a first column of FIG. 7. Images obtained by overlapping the images in the first column of FIG. 7 with images obtained by rotating the images in the first column of FIG. 7 by 90 degrees are shown in a second column. Images obtained by overlapping the images in the first column of FIG. 7 with images obtained by symmetrically moving the images in the first column of FIG. 7 about a vertical central line are shown in a third column. That is, a method of creating natural images having various colors by overlapping natural images obtained by using a single color is illustrated in FIG. 7.

As described above, more various natural images may be created through symmetrical movement, inversion, rotation, and so on of an image.

Embodiment 3

A method of creating a repeated pattern based on an image obtained according to the present invention will be explained.

Figure 8:
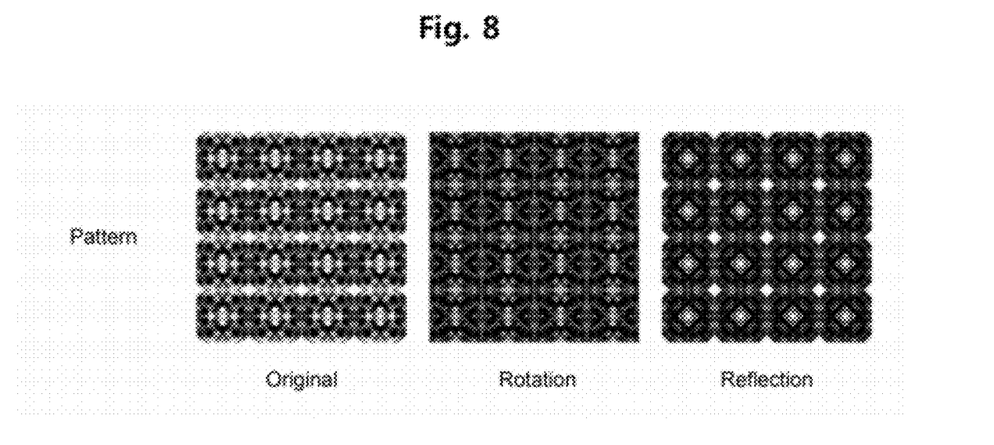
FIG. 8 illustrates images created according to a embodiment 3 of the present invention.

FIG. 8 illustrates pattern images formed by using the 16 images illustrated in FIG. 7.

The images illustrated in FIG. 8 are repeated pattern images obtained by arranging the 16 images illustrated in FIG. 7 such that the images are symmetric about boundary lines with adjacent images.

As such, pattern images which are naturally connected may be formed by arranging natural images obtained in the embodiment 1 of the present invention.

Embodiment 4

A method of creating an image by using a background image will be explained as a embodiment 4 of the present invention. In the first through embodiment 3s, images are obtained in a state where the same material property is applied to an entire design domain as a canvas that is an object to be divided into finite elements, without a specific background image. However, herein below, an image is created by using a background image and applying a material property according to a value of a color of each pixel constituting the background image.

Figure 9:
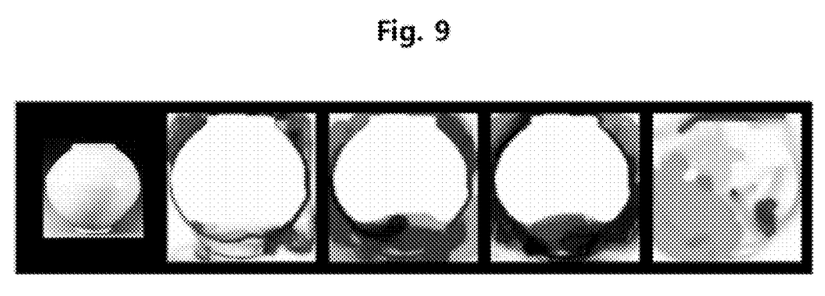
FIGS. 9 and 10 illustrate images created according to a embodiment 4 of the present invention.
Figure 10:
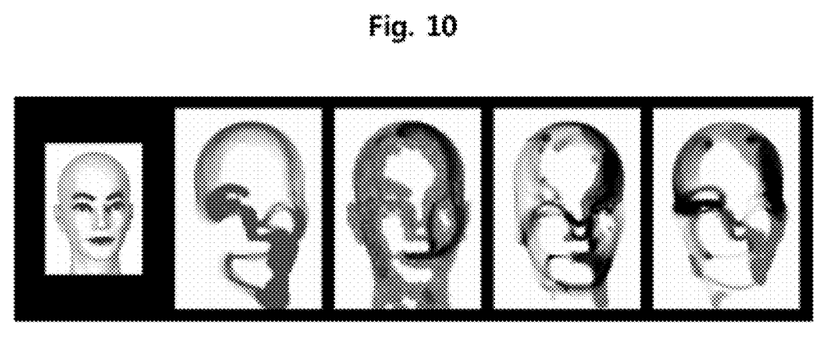

FIGS. 9 through 11 illustrate natural images created by using a background image according to a embodiment 4 of the present invention.

FIG. 9 illustrates a case where a black-and-white image (a first image) of a chinaware is used as a background image. A pixel of the black-and-white image corresponds to one finite element, color information of each pixel is designated with a heat conductivity (material property) of a corresponding finite element, and a process of optimizing a heat transfer path is performed. When a calculation is stopped according to an arbitrary convergence criterion, second through fifth images of FIG. 9 may be obtained. A color may be changed by automatically selecting an arbitrary color, or by designating a color used for each image creation.

FIG. 10 illustrates a case where a black-and-white image (a first image) of a figure painting is used as a background image. When the same process as that described in FIG. 9 is performed, second through fifth images may be obtained.

Although the first through the embodiment 4s have been described, a method of crating a natural image by using a background image in the embodiment 4 may be used in combination with a method of creating a new natural image by using an image of the embodiment 1 or a repeated pattern image in the embodiment 2 and the embodiment 3. That is, an image of the embodiment 4 may be used, instead of an image of the embodiment 1, in the embodiment 2 and the embodiment 3.

Also, although a case where two-dimensional finite elements are obtained by division has been described, the present invention may be applied to a case where three-dimensional finite elements are obtained by division. That is, the present invention may be applied to a design of a visual artwork, such as sculpture, construction, civil engineering, and furniture.

A method of creating an image of the present invention may be used as a method of creating and providing a natural image to a user based on the Internet. For example, if a user accesses a site that provides a service using a method of creating an image of the present invention through the Internet, the user may provide a background image, and the site may follow the background image and provide a soft and natural image that looks like it is drawn by a brush.

As described above, since an image created by a method of creating an image according to the present invention is created based on a governing equation that models the phenomena of the natural world, the image has shading and is natural as if it is drawn by a brush.

An image created based on a phase optimization technique may vary almost infinitely by changing variables that may be arbitrarily adjustable, for example, an initial condition such as a size of an image to be created in an initial setting step, a configuration of the image to be created, and a color of the image to be created, a pre-process step setting condition such as a maximum volume fraction, a maximum iteration number, a convergence criterion, a penalty value material of an SIMP method, a value of a material property, and a boundary condition, and a post-process method.

That is, since infinitely many natural images may be automatically created according to the present invention, more various attempts may be made beyond the limit of human design where a designer directly formulates a concept and expresses the concept and time and efforts may be reduced.

Images created by the method may be applied to industrial products using visual images, that is, all media (RGB, and CMYK) that allow digital output such as a media façade, a textile, and various wallpapers. Also, the images created by the method may be used as a function module included in an image processing tool or a making tool (e.g., Adobe Photoshop or Illustrator).

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, the scope of the present invention should be defined by the appended claims.

What is claimed is:

1. A method of automatically creating a natural image by using an optimization technique, the method comprising:
    an initial setting operation of setting at least one initial condition selected from the group consisting of a size of an image to be created, a configuration of the image to be created, and a color of the image to be created;
    a pre-process operation of assigning a value of a design variable, a value of a material property, and a boundary condition according to the heat transfer equation, and setting at least one variable for an optimization process selected from the group consisting of a target function, a maximum volume fraction, a maximum iteration number, and a convergence criterion;
    an optimization operation of optimizing a design variable by using one optimization technique selected from the group consisting of an optimality criterion (OC), a method of moving asymptotes (MMA), and genetic algorithms according to the variable determined in the pre-process operation; and
    a post-process operation of converting a resultant value of the design variable obtained through a phase optimization process into a digital image.

2. The method of claim 1, wherein the optimization operation comprises dividing the image to be created into finite elements and assigning values of material properties to the finite elements,
    wherein the assigning of the values of the material properties to the finite elements comprises performing interpolation by using a background image such that values of colors given to pixels of the back ground image correspond to the values of the material properties.

3. The method of claim 1, wherein the optimization operation comprises:
    a finite element analysis operation of analyzing a physical system by solving a heat transfer equation under a given boundary condition according to the selected design variable;
    a sensitivity analysis operation of calculating a value of a target function of the optimization process by using a solution of the physical system obtained in the finite element analysis operation, and quantitatively determining how a total value of the target function is affected by a value of a design variable assigned to each of the finite elements in order to determine how to change the design variable;
    a filtering operation of mathematically adjusting a sensitivity of each element obtained in the sensitivity analysis operation to achieve visual harmony with neighboring finite elements in consideration of a value of the sensitivity of each element and an influence of a sensitivity of each neighboring element;
    an optimization operation of determining values of design variables of elements are appropriate in a current operation by using a target function, a sensitivity, and a filtered sensitivity obtained through the finite element analysis operation, the sensitivity analysis operation, and the filtering operation;
    a design variable updating operation of updating the values of the design variables of the current operation obtained in the optimization operation into a new design variable according to a selected optimization algorithm; and
    a convergence determining operation of determining whether a value of a target function before updating satisfies a preset convergence criterion, if the value of the target function does not satisfy the preset convergence criterion, repeatedly performing from the initial finite element analysis operation to the phase optimization process by using the design variable newly set in the design variable updating operation, and if the value of the target function satisfies the preset convergence criterion, proceeding to a resultant structure outputting operation.

4. The method of claim 1, further comprising:
    an operation of creating an image (a) created by the post-process operation and creating a new image (b) by rotating or symmetrically moving the image (a); and
    an operation of creating a new image by overlapping the image (a) and the image (b).

5. The method of claim 1, further comprising:
    an operation of creating a plurality of images by performing the initial setting operation, the pre-process operation, the optimization operation, and the post-process operation two or more times; and
    an operation of creating a new image by overlapping the created plurality of images.

6. The method of claim 1, further comprising an operation of creating an image pattern by sequentially arranging a plurality of the same images to be adjacent to one another or arranging the plurality of the same images such that the images are symmetric, inverted, or rotated about a boundary line.

* * * * *